United States Patent Office 3,094,433
Patented June 18, 1963

3,094,433
ELASTOMERIC FOAM HAVING ITS PORE WALLS COATED WITH FIBROUS BOEHMITE
John Bugosh, Wilmington, Del., and Emmette Farr Izard, Kenmore, N.Y., assignors to E. I. du Pont de Nemours and Company, Wilmington, Del., a corporation of Delaware
No Drawing. Filed Nov. 27, 1959, Ser. No. 855,513
2 Claims. (Cl. 117—98)

This invention relates to improvements in elastomeric foams and more particularly to processes and products resulting from the contacting of elastomeric foams and certain alumina sols.

Processes of the invention are illustrated by the simplified flow diagram shown below:

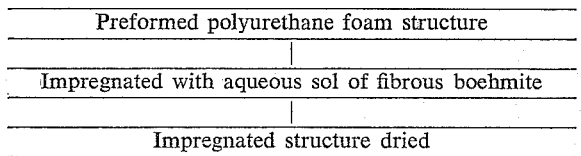

By the term "elastomeric" is meant a material which at room temperature can stretch repeatedly to at least twice its original length and upon immediate release of the stress will return with force to its approximate original length. This art recognized definition is found in "Modern Plastics Encyclopedia," 1950 edition, at page 30. The term "foam" refers to a porous cellular structure containing either continuous or non-continuous gas pockets, such structure being conventionally produced as by blowing procedures (i.e., urethane, etc.) or frothing (Dunlop) procedures (i.e., most foamed natural or synthetic rubbers).

We have now discovered that certain properties of elastomeric foams can be improved by contacting a preformed foam with certain types of alumina sols. Such contacting effects a reinforcing action upon the elastomeric foam and also results in foams which are surprisingly more hydrophilic in nature. Thus, preformed elastomeric foams treated with such alumina sols tend to be reinforced to an unexpected degree and also have an improved water absorption capacity.

These improved properties in so-treated elastomeric foams have obvious value. Stronger foams and more hydrophilic foams are continually being sought in the art.

For example, polyurethane foams are elastomeric foams which form sponge-like materials having abrasive, wear-resistant, heat-resistant surfaces. Polyurethane foams, however, unlike regenerated cellulose and natural sponges are strongly hydrophobic and thus do not absorb water, except by a slight wicking action. Likewise, the permeability of polyurethane foams is very low since a portion of the closed pores caused by foam bubbles do not break, or do not break on all faces, during the foaming and curing steps. Thin skins appear to stretch between all the lamellae of the cured foams, preventing free flow of fluids through the foam.

It is obvious that if hydrophobic polyurethane foams could be made hydrophilic, i.e., could be made to more readily absorb water, the flushing of dirt from the foams would be facilitated, there would be less physical effort required to squeeze or wring fluid from the foam, the foams would pick up more fluid when squeezed and released under the surface of the fluid, the foams could absorb more fluid in a given time, and in general the utility of these foams would be greatly enhanced. However, the expedients heretofore suggested for rendering polyurethane foams hydrophilic have failed to produce a satisfactory improvement in fluid absorption, or have deteriorated the foam to such a degree that the foam for any practical purpose was rendered useless.

This invention provides a simple, economical process for rendering polyurethane foam structures hydrophilic. It provides modified polyurethane foam structures which are hydrophilic, i.e., which more rapidly absorb greater quantities of water than do unmodified polyurethane foam structures.

Examples of other elastomeric foams useful in the present invention include natural rubbers, such as Hevea brasiliensis, Para rubber, and other recognized species; synthetic rubbers, including rubber-like diene hydrocarbon homopolymers, for example, of butadiene, isoprene, 2,3-dimethyl-butadiene and the like; also copolymers of such dienes with other polymerizable vinyl or vinylidene compounds such as styrene, -methylstyrene, 2,5-dichlorostyrene acrylonitrile (sold under the trade names of "Hycar," "Chemigum," and "Perbunan"), methacrylonitrile, methacrylic and acrylic esters (such as methyl, ethyl or higher esters), vinyl ethinyl carbinols (such as dimethyl(vinylethinyl)carbinol), methyl vinyl ketone, methyl isopropenyl ketone, 2-vinyl-5-ethyl pyridine, vinylidene chloride, and the like; synthetic rubber-like materials, including rubber-like haloprene polymers of haloprenes with diene hydrocarbons or with other polymerizable vinyl or vinylidene compounds such as those cited above. Specific examples of this type of elastomer are neoprene GN, neoprene type W, and neoprene type FR; isobutylene copolymers, including copolymers of isobutylene with such diene hydrocarbons as butadiene, isoprene, or piperylene; and polyether-urethane and polyester-urethane.

It has been found that this invention has particular applicability to foams formed from latex by the Dunlop or Talaly processes and to foams of the urethane type. In general, any elastomeric foam can be employed in this invention.

The alumina sol employed contains particles of fibrous alumina monohydrate, a material which is described in detail in U.S. Patent 2,915,475, issued December 1, 1959, on co-pending U.S. patent application Serial No. 783,602, filed December 29, 1958, as a continuation-in-part of then co-pending, now abandoned, U.S. patent application Serial No. 730,025, filed April 21, 1958, now abandoned, as a continuation-in-part of then co-pending U.S. patent application Serial No. 594,265, filed June 27, 1959, and now abandoned. Fibrous alumina monohydrate, solely as a matter of brevity, throughout this application will be termed "fibrous boehmite."

Fibrous boehmite itself is in the form of well-formed and sharply defined little fibers or fibrils. These fibrils have at least one dimension in the coloidal range and the fibril diameters in a particular product are usually quite uniform.

Fibrous boehmite is said to be positively charged because such material when in aqueous suspension (sol) tends to move to the negative electrode when subjected to a direct current voltage in an electrophoresis apparatus. This positive charge is apparent, for example, when an aqueous suspension has a pH between 1 and 6 adjusted with HCl.

While prior art aluminas show some of these properties in common with the alumina under consideration, none of the known aluminas possess all of these properties which are necessary to the present invention. Fibrous boehmite is thus distinct from the aluminum hydroxide, $Al(OH)_3$, which is used commercially as a mordant and other aluminas which may be used in coating various substrates. Inability of prior art aluminas to equal the herein described fibrous alumina monohydrate as an adherent to negatively charged surfaces and as an anchoring agent are attributed to the lack of one or more of the above enumerated properties. For instance, coatings of prior art aluminas do not have the permanence of fibrous boehmite when applied to negatively charged surfaces, nor are prior art aluminas capable of forming more than a mono particle or monomolecular layer on such surfaces. Fibrous boehmite monohydrate can be present as a monoparticle layer or it can form multimolecular and multiparticle continuous layers.

Fibrous alumina suitable in the present invention has an average fibril length in the range of from 25 to 1500 millimicrons, the remaining average dimensions being in the range of 3 to 10 millimicrons. The fibrils have a surface area of between 200 and 400 $m.^2/g$.

Preferred fibrils for use in the processes and products of this invention have an average length in the range of from about 100 to 700 millimicrons, the remaining average dimensions being in the range of from 3 to 5 millimicrons, the axial ratio being from 50:1 to 150:1, and a surface area of from 250 to 350 $m.^2/g$.

Further descriptions of fibrous boehmite herein seems unnecessary, since this substance and its characteristics are fully disclosed and discussed in the aforementioned Serial No. 783,602, now U.S. Patent No. 2,915,475, which material is incorporated herein by reference to the extent necessary.

Fibrous boehmite sols prepared according to the teachings of U.S. patent application Serial No. 783,602, now U.S. Patent No. 2,915,475, may contain in addition to the fibrous boehmite an acid radical which is generally associated with an aluminum ion or a basic aluminum ion. Such sols may be deionized.

Aqueous sols of fibrous boehmite prepared as outlined herein will contain fibrils or aggregates of fibrils which are positively charged and are believed to possess numerous hydroxyl groups that impart surface activity. Whatever molecular structures may be generally inherent in these fibrils or aggregates, it is known that they attach themselves to negatively charged surfaces through bonding, and have an affinity for such surfaces initially prompted by opposite charges leading to electrostatic bonding, which may be supplemented by actual electron sharing in covalent or coordinate bonds.

In general, an aquasol or organosol of fibrous boehmite can contain from $1/100$ to 25% by weight of the fibrous alumina monohydrate.

A more extensive description of fibrous boehmite sols here seems unnecessary since they are fully disclosed in the applications Serial No. 730,025, now abandoned, and Serial No. 783,602, now U.S. Patent No. 2,915,475, and the disclosure there given is incorporated herein by reference.

The fibrous boehmite used in the present invention can be in a dry state initially as individual fibrils or in slightly aggregated state. It may also be used as a dispersion in aqueous or organic systems. The fibrils or fibrous boehmite may be comparatively unassociated in dilute solutions or they may aggregate together to form a tactoid structure of a parallel lateral alignment to form fibrils when concentrated. These aggregates are quite desirable in some uses even though they are supercolloidal in size.

Fibrous boehmite, in addition to being dispersible in water, can be dispersed in organic solvents. A number of such solvents are described in U.S. patent application Serial No. 730,025, now abandoned.

The optimum amount of fibrous boehmite which should be used on any elastomeric film depends in each instance on such independnet variables as the composition of the elastomer employed, its porosity or the lack of porosity, the mode of application, the magnitude of the effect desired, and other factors as previously indicated. Barely a trace will suffice in some applications. In most instances, however, the concentrations of fibrous boehmite on an elastomeric foam will range from about 0.005% to 5.0% by weight based on total weight of treated material, or even much higher, depending upon the particular needs of the user.

According to the present invention, preformed elastomeric foam is impregnated with fibrous boehmite sol by immersing or otherwise conventionally effecting contact between the fibrous boehmite sol and elastomeric foam. The fibrous boehmite, because of its inherent charge, substantively attaches itself to surfaces contacted by the sol in the elastomeric foam.

The fibrous boehmite sol as applied to the elastomeric foam is preferably dilute with respect to its alumina content. It is preferred to use sols containing 10% or less solids, depending upon the retention of treating solution by the foam and the amount of fibrous boehmite desired on the foam. The treating solution can vary most broadly between 0.005 and 10% fibrous boehmite, but it is generally preferred to use between 0.1 and 5% concentration. In those cases where the fibrous boehmite particles are substantive to the surface of the elastomeric foam being treated, it is preferred to use even lower concentrations of fibrous boehmite in the treating solution, as for example 0.01 to 1%. The concentration of the treating solution is governed by the treating process employed and the amount of fibrous boehmite desired on the foam, which in turn is dependent upon the degree of reinforcement desired.

In a process of the invention the elastomeric foam and the alumina sol are brought into contact with each other in such a manner that the sol thoroughly impregnates the foam. The sol can be sprayed onto the foam or the foam can be immersed in the sol for a period of time sufficient to insure penetration. A preferred methtod is to squeeze the foam while it is submerged in an excess of the alumina sol.

Excess sol, that is, sol in excess of the amount of alumina desired in the final product, can be squeezed out of the foam after it has been saturated, as by passing the foam through a suitably adjusted pair of wringer rolls.

It cannot be assumed that fibrous boehmite is retained in all types of foam in exact proportion to the amount of sol retained. On the contrary, in the treatment of certain types of elastomeric foams, as for example those made by the Talalay process whereby the foamed elastomer is frozen and then gelled by exposure to carbon dioxide gas prior to heat curing, the fibrous boehmite is "exhausted" from the sol onto the foam, so that the liquid squeezed out as above-mentioned will have a lower fibrous boehmite content than that of the initial treating sol. Thus, by exhaustion is meant the deposition of a greater amount of alumina onto the foam than can be accounted for on the basis of treating solution pickup. The mechanism by which this process occurs is believed to be similar to that occurring in dyeing operations; i.e., the colloidal particles are substantive to or have an affinity for the foam surface due to dissimilar surface potentials and are attracted from solution onto the surface.

The exact amount of fibrous boehmite to be contained in the treating solution is, therefore, determined to some extent by whether exhaustion is occurring or not and if it is, then to what degree. In general, if the fibrous boehmite is substantive to the elastomeric foam surface, then the lower treating solution concentration range of from about 0.01 to 1.0% will be satisfactory. If treatment is being effected by pickup and drydown of the treating solution, then the higher treating solution concentrations up to 10% will be preferred. It will be understood that as much fibrous boehmite as desired, consistent with the reinforcement wanted, may be used on the foam, but more than about 10% by weight based on the final product is usually considered undesirable because of the resultant hard, boardy characteristics resulting which are unlike those of elastomeric foams. There may be, however, certain applications where a board-like product is desirable, as for instance in the manufacture of polyether urethane acoustical covering for walls and ceilings. If reinforcement to this extreme degree is desirable, then it is to be understood that treatment with fibrous boehmite to concentrations greater than 10% by weight based on the finished product is a teaching of this invention as a means of gaining such reinforcement.

Reinforcement is developed in the treated foam by drying the fibrous boehmite sol in contact with the foam. Drying can be accomplished in any desired manner as, for instance, in a circulating air oven or with radiant heat. Since elastomeric foams are somewhat heat sensitive, the usual precautions will be taken to avoid overheating.

The treated and dried foam is found to be substantially reinforced, and the degree of reinforcement when exhaustion occurs during treatment is substantially greater than is achieved by treating the foam with any other known inorganic colloidal material. This is demonstrated by subjecting the foam to repeated flexing and measuring the load-carrying ability after specified number of flex cycles. Although there is an initial loss of "false" reinforcement, thereafter the treated foam demonstrates substantially improved load-carrying ability.

The increased reinforcement is thought to be due to more uniform distribution of the alumina over the internal rubber structure and better adhesion of the fibrous boehmite to the rubber.

The following examples of preferred embodiments will further serve to illustrate the principles and practice of this invention. Percentages are by weight unless otherwise indicated.

EXAMPLE 1

A polyurethane foam is made by mixing 432 grams of a mixture consisting of 80% toluene-2,4-diisocyanate and 20% toluene-2,6-diisocyanate for 10 seconds, using bent wire mixers turning at a slow speed, with a mixture consisting of:

| | |
|---|---|
| Polyester resin [1] grams | 1049 |
| Polyoxyethylated vegetable oil do | 15 |
| Water cc | 38 |
| N-methyl morpholine cc | 15 |
| Diatomaceous silica, average particle size 2.4 microns grams | 30 |

[1] Polyester resin—reaction product of diethylene glycol, adipic acid and trimethylpropane in a 13/13/1 molar ratio. Physical properties are:

| | |
|---|---|
| Viscosity cps | 16,000 |
| Acid No. | 2.02 |
| Specific gravity | 1.194 |
| Percent water | 0.17 |
| Solids | 100% |
| Hydroxyl No. | 66.8 |

As quickly as possible the foam is poured into a mold 13" x 15" x 19". Foaming takes place in about 15–30 seconds and is complete in 2 minutes. The foam is cured overnight at room temperature.

The resulting hydrophobic polyurethane foam is impregnated with a 2.5% dispersion of fibrous alumina monohydrate stabilized with acetic acid and then dried at 70° C. to produce hydrophilic foam.

The rate of absorption of the treated foam in any direction is ⅛–1 inch per 5 seconds. The rate of absorption for foam made in an identical manner except that it has not been treated as described is less than 1/16 inch per second. This rate of absorption is measured after thorough washing with water and wringing in a washing machine wringer. The rate is observed by immersing the foam in a water solution at room temperature containing a small amount of nigrosine black water soluble dye and observing the rise of water containing dye.

The improved rate of absorption is further demonstrated by the amount of water picked up from a shallow tray of water in a short time. The sample of the product described above, 3" x 3" x 1", is thoroughly wet with water and squeezed in a washing machine wringer to remove excess water and weight. The sample is then laid on a porous grid positioned ⅛" beneath the surface of the water and after exactly 5 seconds, the sample is removed and weighed to determine the amount of water absorbed in the foam. A control of the same size is tested in the same manner. The alumina treated foam absorbs 31 grams of water in the allotted time whereas the control sample absorbs only 2 grams of water.

The water permeability of the product of this example is greatly improved over the control. A 1" section of this product is held tightly between 2" pipe flanges and a 2' head of water is maintained above the sample. The rate of water flow through the sample is measured. Controls of the same thickness made in an identical manner but with no treatment after foaming and curing, are also tested. The rate of flow through the alumina treated foam sample is 5070 grams per minute, and through the control sample is 3300 grams per minute.

The preparation of polyurethane foam structures by reacting water with free isocyanate radical-containing organic polymeric products is described in "German Plastics Practice," by De Bell et al., 1946, pp. 316 and 463–465. Polyurethane foams applicable to this invention may be produced by employing reactants and methods, such as disclosed in U.S. Patents Numbers 2,282,827 (Rothrock); 2,284,637 (Catlin); 2,284,896 (Hanford et al.); 2,292,443 (Hanford); 2,333,639 (Christ et al.); 2,358,475 (Pratt et al.); 2,374,163 (Rothrock); 2,787,601 (Detrick et al.); and U.S. applications Serial Numbers 369,240 (Barthel), filed July 20, 1953, now U.S. Patent No. 2,788,335; 381,745 (Mitchell), filed September 21, 1953, now U.S. Patent No. 2,850,464; 383,370 (Barthel), filed September 30, 1953, now U.S. Patent No. 2,833,730; 395,843 (Roussel), filed December 2, 1953, now U.S. Patent No. 2,842,509; and 405,036 (Mitchell), filed January 19, 1954, now U.S. Patent No. 2,914,600. In general, the free isocyanate radical-containing organic polymers embrace a wide variety of compounds and are prepared by reacting a polymeric organic substance containing a plurality of groups containing active hydrogen atoms with an organic compound containing as the sole reacting group a plurality of isocyanate groups.

An organic compound containing as the sole reacting group a plurality of isocyanate groups may be any of the poly-NCO compounds, i.e., any polyisocyanate. The preferred compounds are those having two groups of the formula —NCO. Examples of this class are: 2,4-toluene diisocyanate, 2,6-toluene diisocyanate, m-phenylene diisocyanate, 4-chloro-1,3-phenylene diisocyanate, 1-chlorophenylene 2,4-toluene diisocyanate, naphthalene-1,5-diisocyanate.

Polymeric organic substances containing a plurality of groups containing active hydrogen may be selected from a wide variety of polyfunctional compounds, including polyamines, polyalcohols, aminoalcohols, polyhydroxy ethers, polyhydroxy esters, polyamides, polythiols, polysulfonamides and various mixtures of these types. Typical of many organic compounds which are useful in this connection are ethylene glycol, diethylene glycol, glycerine, diethanolamine, N-ethylethanolamine, triethanolamine, adipamide, m-phenylene diamine, propylene diamine, sulfanilamide, p-aminophenol, succinamide and 2,4-toluene diamine. Other long chain polyhydroxy and polycarboxy compounds useful in this invention are alkyd resins containing terminal hydroxyl and carboxyl groups. Examples of the alkyd resin reactants are: glycols, glycerine, trimethylol propane reacted with dibasic acids such as adipic, phthalic, succinic, maleic and carbonic.

The term "active hydrogen" is used herein to denote hydrogen atoms which display activity according to the Zerewitinoff tests, as described by Kohler in Journal of American Chemical Society, 49, p. 3181 (1927).

A tertiary amine catalyst is preferably used during the formation of the foam to accelerate the reaction between the isocyanate, water and active hydrogen-containing compounds, and also, by proper selection of the catalyst to control the rate of foaming and the cell structure of the foam. The catalyst may be omitted and a longer time for curing may be used, or the reaction may be speeded up by the use of elevated temperatures. However, it is much simpler and more practical to add the tertiary amine catalyst to cause the reaction to take place rapidly and permit the final curing at room temperature. The more basic amines appear to be the most effective as catalysts, and those of relatively low volatility are preferred so that they will not escape to any objectionable degree during the reaction and so they will not impart to the product an objectionable odor. The following tertiary amines are illustrative of those particularly useful as catalysts in this reaction: N-methyl morpholine, triethylamine, diethyl-cyclohexylamine, dimethylhexadecylamine, triethanolamine, pyridine, quinoline and 3-methyl-isoquinoline. The amount of catalyst may range from essentially none at all to several times by weight the amount of water used.

EXAMPLE 2

A prepolymer is prepared as follows: 300 grams of polyether block copolymer containing 90% propylene oxide with 10% polyethylene oxide (molecular weight approximately 2000) and 27.3 grams of toluene diisocyanate are heated together at 120° C. with stirring under a nitrogen blanket for two hours. An additional 64.2 grams of toluene diisocyanate are slowly added at 120° C. during 30 minutes. The reaction mixture is then quickly cooled to 30° C. To form a foam structure, 50 grams of the resulting prepolymer together with 0.5 gram of polyoxyethylated vegetable oil, 0.5 gram of N-methyl morpholine and 0.5 gram of water are rapidly mixed and then poured in a mold to foam. After the foam has risen to its maximum height, it is placed in an oven at 75° C. to cure for 4 hours. This foam is very soft and springy, but does not wet well with water.

A sample of this foam is then impregnated with a dispersion of fibrous alumina monohydrate as described in Example 1, and is oven-dried. The treated sample shows improved wicking and absorption properties of the order of the previous example.

The unique feature of the present invention is that a previously hydrophobic polyurethane foam is made hydrophilic. This property, in addition to its unaltered properties of "feel," appearance, wear-resistance, heat-resistance, permanent softness, abrasiveness and freedom from bacterial degradation that give it customer appeal, makes polyurethane foam sponges desirable for household and industrial usage. As a result of the treatment of this invention, flushing dirt from the foam is improved, less physical effort is required to squeeze or wring the water from the foam, the foam picks up more water when squeezed under the surface of a fluid, and the treated foams absorb more water from the surface in a given time since the foam is more permeable.

Specific improved products which can be made by application of the above invention in addition to all-purpose household and industrial scrubbing and wiping sponges mentioned before, include household and industrial scrubbing and wiping mops and a quick-drying sponge mop which is less susceptible to bacterial degradation. Other sponge uses, such as disclosed in Banigan et al., U.S. Patent Numbers 2,280,022 and 2,295,823 and Saffert, 2,138,712, may apply to the improved product and provide functional uses and wider utility than any sponge herebefore known. It will be understood that polyurethane foams treated so that they become hydrophilic by the treatment of the present invention may be used for any purpose for which their hydrophilic properties render them suitable.

The hydrophilic properties obtained by treating polyurethane foam structures in accordance with the process of this invention may be preserved against the deteriorating action of soaps and detergents and rendered permanent by further treating the foam structures with an aqueous dispersion of an inorganic negative colloid such as polysilicic acid, as described and claimed in the co-pending application of John Bugosh, Serial Number 734,410, filed May 12, 1958, or with an aqueous dispersion of finely divided hydrophilic organic polymer, as described and claimed in the copending application of John Bugosh, Serial Number 734,409, filed May 12, 1958. Both of said applications are now abandoned but replaced by a co-pending continuation-in-part application, Serial No. 856,295, filed November 30, 1959, by John Bugosh, now U.S. Patent No. 3,013,901.

EXAMPLE 3

A dry, free flowing, redispersible powder is prepared from aquasol by spray-drying, according to procedures described in Serial No. 783,602, now U.S. Patent No. 2,915,475. There is obtained a translucent sol which analyzes as follows:

Percent $Al_2O_3$ ---------------------------------- 5.05
Percent $CH_2COOH$ -------------------------------- 2.37
$L_f$ ------------------------------millimicrons-- 287
Specific surface area-----------------$m.^2/g$-- 307

This sol is spray dried to produce a free-flowing product, 100% dispersible in water, which analyzes as follows:

Percent $Al_2O_3$ ---------------------------------- 72.2
Percent $CH_2COOH$ -------------------------------- 8.0
$L_f$ ------------------------------millimicrons-- 277
Specific surface area-----------------$m.^2/g$-- 281
Average fibril length as determined by the spray mist technique ------------------------------------ 80

A dry product prepared as above is used to reinforce foam rubber in the manner described below.

A fibrous boehmite powder containing 69.2% $Al_2O_3$ and 9.49% acetic acid with surface area=$m.^2/g$. is dispersed in distilled water to form baths in the concentration range 0.1% to 0.4% solids.

Commercially produced Talalay process foam, made from a blend of natural rubber and GR–S (butadiene-styrene) lattices is cut in foot square test pieces which are dip treated in one case in distilled water and other cases in the boehmite dispersions by submersing them, squeezing repeatedly under the liquid surface and then passing through wringer rolls to remove excess sol. The treated foam samples are dried in a circulating air oven at 120° C. for 45 minutes, allowed to equilibrate in the laboratory for 24 hours before testing in accordance with ASTM D1055–56T.

After fatigue exposure of all foam samples by flexing them 250,000 times to 50% of their original height, the load-bearing capacity of the treated samples is found to be greatly increased in comparison with the untreated foam and to vary in proportion to the boehmite content found on the foam by analysis as follows:

| Percent Boehmite Solids on Foam (by analysis) | Percent Increase in Load Bearing Capacity Over Untreated Control for Foam of Absolute Density 0.075g./cc. When Loaded to 50% Deflection. |
|---|---|
| 0.6 | 40 |
| 0.9 | 48 |
| 1.1 | 73 |
| 1.5 | 95 |
| 3.1 | 121 |

EXAMPLE 4

A typical polyether-urethane foam is cut into pieces 2½" x 12" x 15". These pieces are dried at 75° C. to constant weight and their density measured; all pieces have an initial density within the limit of error of the measurement method, the average density being 0.0349 g./cc. or 2.1 lbs./cu. ft.

These pieces are then treated in dispersions of fibrous boehmite (69.24% $Al_2O_3$, 9.49% $Al_2O_3$, surface area by B.E.T. method 297 m.$^2$/g., fiber length by S.B. 384 m$\mu$, by viscosity 232 m$\mu$) containing 0%, 2.5% and 5.0% solids, by squeezing the foam repeatedly under the surface of the treating solution, passage through a set of laundry-type wringer rolls and finally drying to constant weight in a forced air oven at 120° C.

The amount of fibrous boehmite deposited on the foam by virtue of the above treatment is calculated from the dry weight of the foam before and after treatment, the wet weight of the foam after treatment and the concentration of the treating solution.

The effect of repeated flexing of the treated foam samples on their load-bearing capacity after 100,000 flexes is shown in the following table. The samples are fatigued by flexing to 50 percent of their relaxed height at the rate of 60 flexes per minute. The force required to compress a 50 sq. in. circular area in the center of the sample to 25 percent and 50 percent of the relaxed height of the foam is measured for each treated specimen. The initial reinforcing action of the fibrous boehmite is somewhat reduced within 25 flexings, but most of the remainder of the reinforcement is retained even after 100,000 flexings.

*Table I*

| Treating Agent | Percent Boehmite on Foam | | Foam Density, g./cc. | Performance After 100,000 Flexes | | | |
|---|---|---|---|---|---|---|---|
| | By Wet Pickup | By Dry Wt. Incrs. | | Lbs. Compression to Deflect | | Percent Reinforcement [1] | |
| | | | | 25% | 50% | 25% Deflctn. | 50% Deflctn. |
| Water | 0 | 0 | 0.0347 | 18.75 | 29.25 | | |
| Fibrous Boehmite | 2.0 | 1.6 | 0.0350 | 21.75 | 32.25 | 16.0 | 9.7 |
| Sol | 4.4 | 3.5 | 0.0358 | 21.50 | 33.25 | 14.6 | 12.9 |

[1] Percent reinforcement is defined as the difference in compression resistance between treated and untreated foam of equal density, expressed as a percentage of the compression resistance of the untreated foam.

It will be seen that treatment of this foam with fibrous boehmite results in substantial increase in the load-bearing capacity or resistance to compression of the foam, without increasing the density of the foam, i.e., causing the foam to shrink.

EXAMPLE 5

The fibrous boehmite described in Example 4 is used for the treatment of an elastomeric foam made by the Talalay process, containing 70% natural rubber and 30% butadiene-styrene copolymer synthetic rubber. The foam is commercially produced cored, automotive topper pad stock. It is cut into pieces 12" x 12" x 2.5" and treated, as described in Example 4, in aqueous dispersions of fibrous boehmite ranging in concentration from 0.1% to 4.0% solids.

The amount of fibrous boehmite retained on the foam is determined by chemical analysis of the treated foam. Comparison of the amount found by analysis with the maximum amount which could have been deposited due to retention and drydown of the treating solution, shows that exhaustion of fibrous boehmite occurs on this foam.

The load-bearing capacity of the treated and untreated foam is measured as described in Example 4, after having been fatigued by flexing 250,000 times to 50% of the relaxed height of the foam. The following table summarizes the test data obtained on this foam:

*Table II*

| Fibrous Boehmite Treating Solution Conc., percent | Fibrous Boehmite on Treated Foam | | Foam Density, g./cc. | Performance After 250,000 Flexes | | | |
|---|---|---|---|---|---|---|---|
| | Percent Based on Sol'n Pickup | Percent by Chemical Analysis | | Lbs. Compression to Deflect | | Percent Reinforcement at— | |
| | | | | 25% | 50% | 25% Deflctn. | 50% Deflctn. |
| 0.0 | 0.00 | 0.00 | 0.0687 | 14.9 | 30.0 | | |
| 0.1 | 0.06 | 0.56 | 0.0707 | 21.7 | 42.7 | 47 | 44 |
| 0.3 | 0.19 | 0.61 | 0.0695 | 18.7 | 37.0 | 31 | 32 |
| 0.7 | 0.44 | 0.94 | 0.0691 | 21.0 | 39.2 | 47 | 38 |
| 1.0 | 0.69 | 1.08 | 0.0700 | 22.5 | 46.0 | 52 | 59 |
| 2.0 | 1.33 | 1.46 | 0.0699 | 25.2 | 51.2 | 71 | 77 |
| 4.0 | 3.06 | 3.09 | 0.0693 | 28.2 | 56.7 | 96 | 109 |

The above data show that at low treating bath concentrations most of the fibrous boehmite is deposited by exhaustion onto the foam, and that boehmite deposited in this manner reinforces the foam with a higher degree of efficiency than boehmite deposited mainly by drydown of the treating dispersion on the foam.

The data also show that treatment with fibrous boehmite does not significantly increase the density of the foam; that is, cause the foam to shrink decreasing its volume.

The most important effect of the fibrous boehmite treatment shown by the above data is the great increase in the load carrying capacity of the treated foam, even after flexing 250,000 times.

We claim:

1. An elastomeric foam structure the pore walls of which are coated with fibrous boehmite, the elastomer of said structure being a material which at room temperature can be stretched repeatedly to at least twice its original length and upon release of the stress will return with force to its approximate original length, and being selected from the group consisting of natural rubber and synthetic rubbers of the group consisting of (1) rubber-like diene hydrocarbon homopolymers, (2) copolymers of said homopolymers with polymerizable vinyl and vinylidene compounds, and (3) copolymers which are rubber-like haloprene polymers of haloprenes with compounds of the group consisting of diene hydrocarbons and other polymerizable vinyl and vinylidene compounds.

2. Foam rubber having its pore walls coated with fibrous boehmite.

References Cited in the file of this patent

UNITED STATES PATENTS

| | | |
|---|---|---|
| 1,620,940 | Bleecker | Mar. 15, 1927 |
| 2,433,849 | Lathrop et al. | Jan. 6, 1948 |
| 2,915,475 | Bugosh | Dec. 1, 1959 |
| 2,921,866 | Wilson | Jan. 19, 1960 |
| 2,955,958 | Brown | Oct. 11, 1960 |
| 3,013,901 | Bugosh | Dec. 19, 1961 |